US012679313B2

(12) United States Patent
DeAngelo, Jr.

(10) Patent No.: US 12,679,313 B2
(45) Date of Patent: Jul. 14, 2026

(54) STOP KNOB FOR VEHICLE AIR BRAKE

(71) Applicant: STOP KNOB, LLC, Newport Beach, CA (US)

(72) Inventor: Michael DeAngelo, Jr., Newport Beach, CA (US)

(73) Assignee: STOP KNOB, LLC, Newport Beach, CA (US)

( * ) Notice: Subject to any disclaimer, the term of this patent is extended or adjusted under 35 U.S.C. 154(b) by 379 days.

(21) Appl. No.: 18/421,146

(22) Filed: Jan. 24, 2024

(65) Prior Publication Data

US 2025/0236270 A1 Jul. 24, 2025

(51) Int. Cl.
B60T 7/08 (2006.01)
B60T 13/38 (2006.01)
B60T 17/18 (2006.01)
F16K 35/00 (2006.01)

(52) U.S. Cl.
CPC .............. B60T 7/08 (2013.01); B60T 13/385 (2013.01); B60T 17/18 (2013.01); F16K 35/00 (2013.01)

(58) Field of Classification Search
CPC .......... B60T 7/08; B60T 13/385; B60T 17/18; F16K 35/00
See application file for complete search history.

(56) References Cited

U.S. PATENT DOCUMENTS

| | | | | |
|---|---|---|---|---|
| 4,307,917 | A * | 12/1981 | Hasselbacher | ........ B60T 15/041 303/10 |
| 9,381,895 | B1 * | 7/2016 | Smathers | ................ B60T 13/26 |
| 2005/0093365 | A1 * | 5/2005 | McCann | .............. B60T 15/041 303/3 |

* cited by examiner

*Primary Examiner* — Tan Q Nguyen
(74) *Attorney, Agent, or Firm* — Womble Bond Dickinson (US) LLP

(57) ABSTRACT

A locking knob for an air brake valve may include a push rod and a locking ring. The push rod may include a knob head at a first end of the push rod, first thread along an exterior surface of the push rod, and a cavity within the push rod exposed at a second end of the push rod opposite of the first end, the cavity configured to house an actuating arm of the valve that is held fixed to the push rod. The locking ring may include a channel that is configured to house the push rod, and second thread within the channel that is configured to mate with the first thread. Rotation of the locking ring restricts movement of the push rod and actuating arm.

20 Claims, 9 Drawing Sheets

CAVITY /
ACTUATING ARM

SPRING
LOADED
FASTENER

502

504

606

LOCKING KNOB
FOR THREADED
ACTUATION ARM
602

604

608

610

STOP KNOB FOR VEHICLE AIR BRAKE

FIELD

Embodiments of the present disclosure relate generally to a locking knob, and more particularly, a lockable push knob of an air brake system.

BACKGROUND

Vehicles such as a mobile home or other large wheeled vehicles may include an air brake system. An air brake system (e.g., a pneumatic air brake system) uses compressed air to change the state of the brakes between the brakes being on and the brakes being off. A vehicle air brake system may include three different braking systems: a service brake, a parking brake, and an emergency brake.

BRIEF SUMMARY

In one aspect, a locking knob for a valve (e.g., an air valve), includes a push rod and a locking body. The push rod includes a knob head at a first end of the push rod, first thread along an exterior surface of the push rod, and a cavity within the push rod exposed at a second end of the push rod opposite of the first end. The cavity within the push rod is configured to house an actuating arm of the valve that is held fixed to the push rod. The locking ring includes a ring-shaped body with a channel that is configured to house the push rod, and second thread within the channel that is configured to mate with the first thread. Rotation of the locking ring in a first direction moves the locking ring toward the second end of the push rod which restricts travel of the push rod and the actuating arm of the air valve by a threshold amount to prevent actuation of the air valve. A second rotation of the locking ring in a second direction moves the locking ring up the rod toward the first end and permits the travel of the rod to at least the threshold amount to allow actuation of the air valve.

In one aspect, an air brake valve assembly includes one or more first fluid ports (e.g., an input), one or more second fluid ports (e.g., an output), a valve, and the locking knob described above. The valve is configured to fluidly connect or fluidly disconnect the one or more first ports with the one or more second ports, depending on the position of the valve and actuating arm. The actuating arm of the air valve assembly is coupled to the valve and to the locking knob. In response to displacement of the actuating arm satisfying a threshold distance, the valve is moved to a first position, and in response to displacement of the actuating arm not satisfying the threshold distance, the valve is moved to a second position.

In one aspect, a vehicle, includes a pneumatic air brake (e.g., a parking brake), a fluid pressure source (e.g., compressed air); and the air valve described above with the locking knob. The air valve is fluidly connected between the fluid pressure source and the pneumatic air brake through one or more fluid lines. The locking knob is attached to the actuation arm of the air valve and locks the brakes in the engaged (brakes are applied) position when the locking ring is rotated toward the second end of the push rod (toward the air valve), thereby preventing accidental release of the brake.

Other technical features may be readily apparent to one skilled in the art from the following figures, descriptions, and claims.

BRIEF DESCRIPTION OF THE DRAWINGS

The aspects are illustrated by way of example and not by way of limitation in the drawings in which like references may indicate similar elements. It should be noted that reference to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect. It should be understood that some of the embodiments shown may be combined with other embodiments even if not shown as such in each figure.

DETAILED DESCRIPTION

Figure 1:
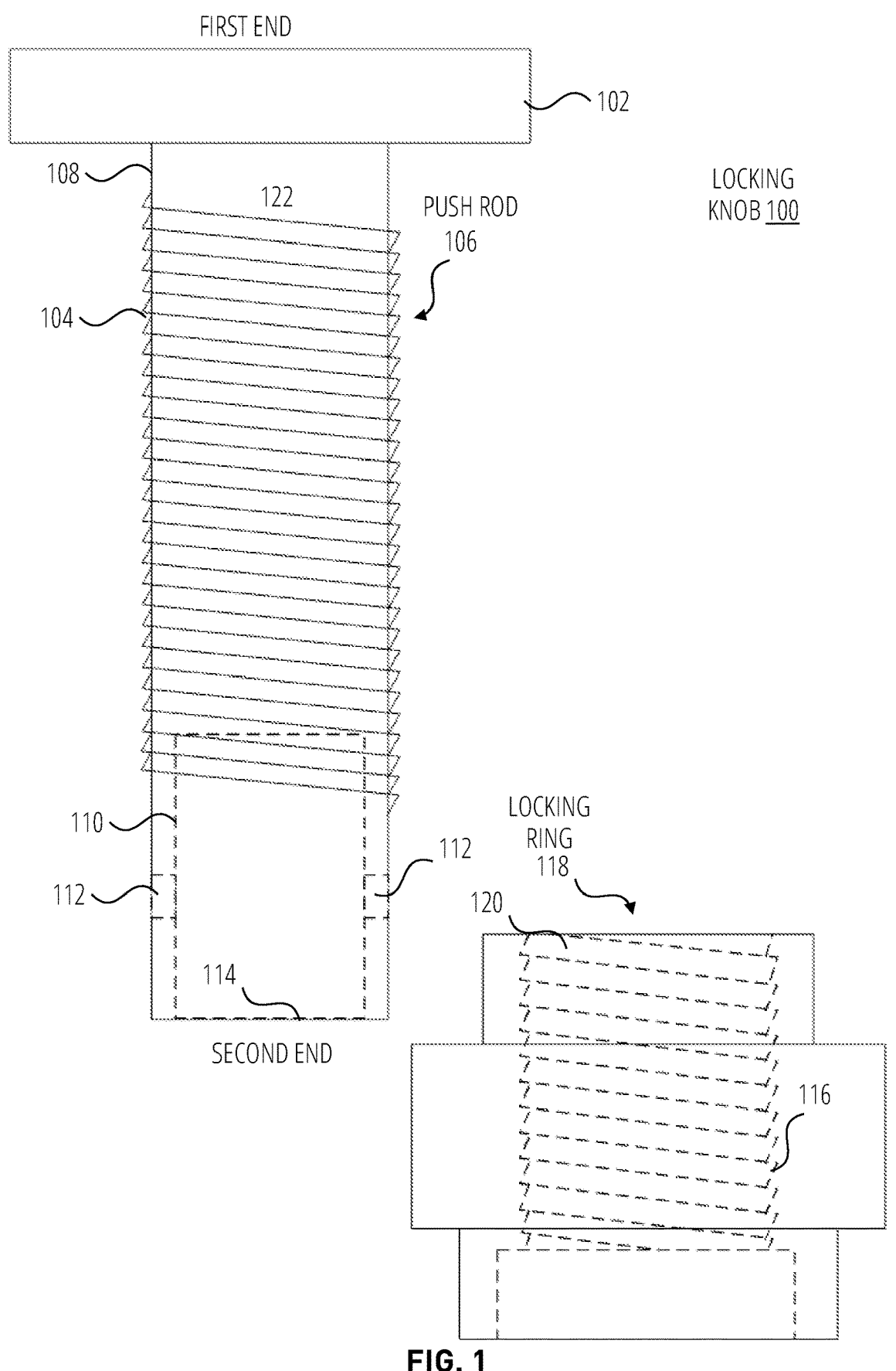
FIG. 1 shows a locking knob in a disassembled state, in accordance with an embodiment.

An air brake system of a vehicle may user air pressure, transferred through pneumatic air lines (e.g., hoses), to control operation of vehicle air brakes. The air brake system may include a parking brake. The parking brake may be controlled by a push-pull button on a dash of the vehicle. The push-pull button may be coupled to an air brake valve. When the push-pull button is in a pulled position (the button is extended outward from the air brake valve), the vehicle parking brake is engaged. When the button is in the pushed position (the button pushed into the air brake valve), the parking brake is released.

Brakes are vital to proper operation and safety of a vehicle. A parking brake push-pull button may be accidentally 'pushed' which may lead to inadvertent release of the brake and an unexpected movement of the vehicle. This can lead to damage to the vehicle, or even harm to a person.

Conventional safety systems may include a slip-on and slip-off lockable collar that is fixed and locked to the push-pull button to lock it out, and removed when the user wishes to release the parking brake. Some conventional safety systems employ a lockable housing that covers the entire push-pull button, thereby preventing an inadvertent 'push' of the push-pull button. Such solutions, however, are cumbersome because they require separate components (e.g., a housing, a key, a collar, etc.) which may require additional storage and organization—the parts may become lost or unavailable when needed. Importantly, the act of finding the housing/collar, fitting it on or over the push-button, and then locking the device and storing the key to a dedicated place, involves numerous steps and become tiresome and error prone over time.

Aspects of the present disclosure relate to a push button with a locking mechanism that couples to or is integral with the air brake valve. The lockable push button has the locking mechanism attached as part of the push-pull button. There are no additional parts to manage, track, and store. Further, the lockable push button may be manually adjusted (e.g., without tools, without a key, etc.) simply by rotation of a locking ring that is fixed to the push button, to either prevent disengagement of the air brake (when in the locked position), or to permit disengagement of the brake (when in the unlocked position). This allows for a simplified locking and unlocking of the air brake with reduced steps compared to the conventional safety systems.

Generally, in accordance with aspects of the present disclosure, a locking knob for an air brake valve may include two linked parts—a push rod and a locking ring—that work together to provide a simple locking interface on an air brake valve. Each part may be a machined metal part (e.g., aluminum or other suitable material). The locking ring threads in connection with the push rod. The locking knob may serve as a permanent replacement knob for many variations of push-pull parking air brake valves. Aspects described may be secured to the air brake valve by one or more fasteners such as, for example, a supplied screw (e.g., a single screw or mating screws), a quick release ball lock, threading, or other hardware fastener.

Once the locking knob is installed on air brake valve, when the parking brake is engaged (e.g., in the pulled-out position), a user may manually turn the locking ring until it rests against the air brake valve or the instrument panel on which the air brake valve is attached to. The parking brake becomes securely locked by the locking ring in this position, thereby preventing inadvertent release of the parking brake. To release the parking brake, a user may simply loosen the locking ring by turning the locking ring in the opposite direction. The locking ring moves away from the air brake valve, giving additional clearance to push the push rod portion of the locking knob into the air brake valve, thereby releasing the parking brake.

FIG. 1 shows a locking knob in a disassembled state, in accordance with an embodiment. Locking knob 100 includes two separable parts, a push rod 106 and a locking ring 118.

The push rod includes a knob head 102 and a shaft 122. The knob head 102 is located at a first end of the push rod, first thread 104 is located along an exterior surface 108 of the push rod, and a cavity 110 is located within the push rod (e.g., at a second end of the push rod). The cavity and the thread 104 are located at the shaft 122 of the push rod. The cavity 110 is exposed at a second end of the push rod opposite of the first end. The exposed portion 114 of the cavity 110 may be configured to house an actuating arm of the valve that is held fixed to the push rod 106, as shown in other figures.

In the present disclosure, when an object is said to be configured in a certain manner, this refers to the object having a position, a geometry, geometric features, size, alignment, or hardware, to serve a specified purpose or role. For example, the cavity 110 may have a size, shape, and orientation to receive the actuating arm of the valve inside of the cavity. The cavity may be complementary in shape and size to the actuating arm.

The locking ring 118 may comprise a ring-shaped body with a channel 120 that is configured to house the push rod 106. The locking ring 118 includes second thread 116 within the channel that is configured to mate with the first thread 104.

The push rod 106 may comprise one or more openings 112 extending from the cavity 110 of the push rod to the exterior surface 108 of the push rod. The one or more openings 112 may serve as a receptacle for a fastener such as a quick release ball lock, a screw, etc. The fastener holds the actuating arm of the valve fixed to the push rod. This is described further in other sections.

When assembled together and when attached to a valve, the locking knob 100 provides a user-friendly and reliable mechanism to lock the parking brake or other air brake on a vehicle in a desired state.

For example, when installed in an air brake valve, rotation of the locking ring 118 in a first direction (e.g., clockwise or counterclockwise) moves the locking ring toward the second end of the push rod which restricts travel of the push rod and the actuating arm of the air valve by a threshold amount to prevent actuation of the air valve. A second rotation of the locking ring 118 in a second direction (in an opposite direction of the first direction) moves the locking ring 118 up the rod toward the first end and permits the travel of the rod to at least the threshold amount to allow actuation of the air valve. This movement of the locking ring into a locked and unlocked position is further illustrated, for example, in FIG. 2 and FIG. 3.

Figure 2:
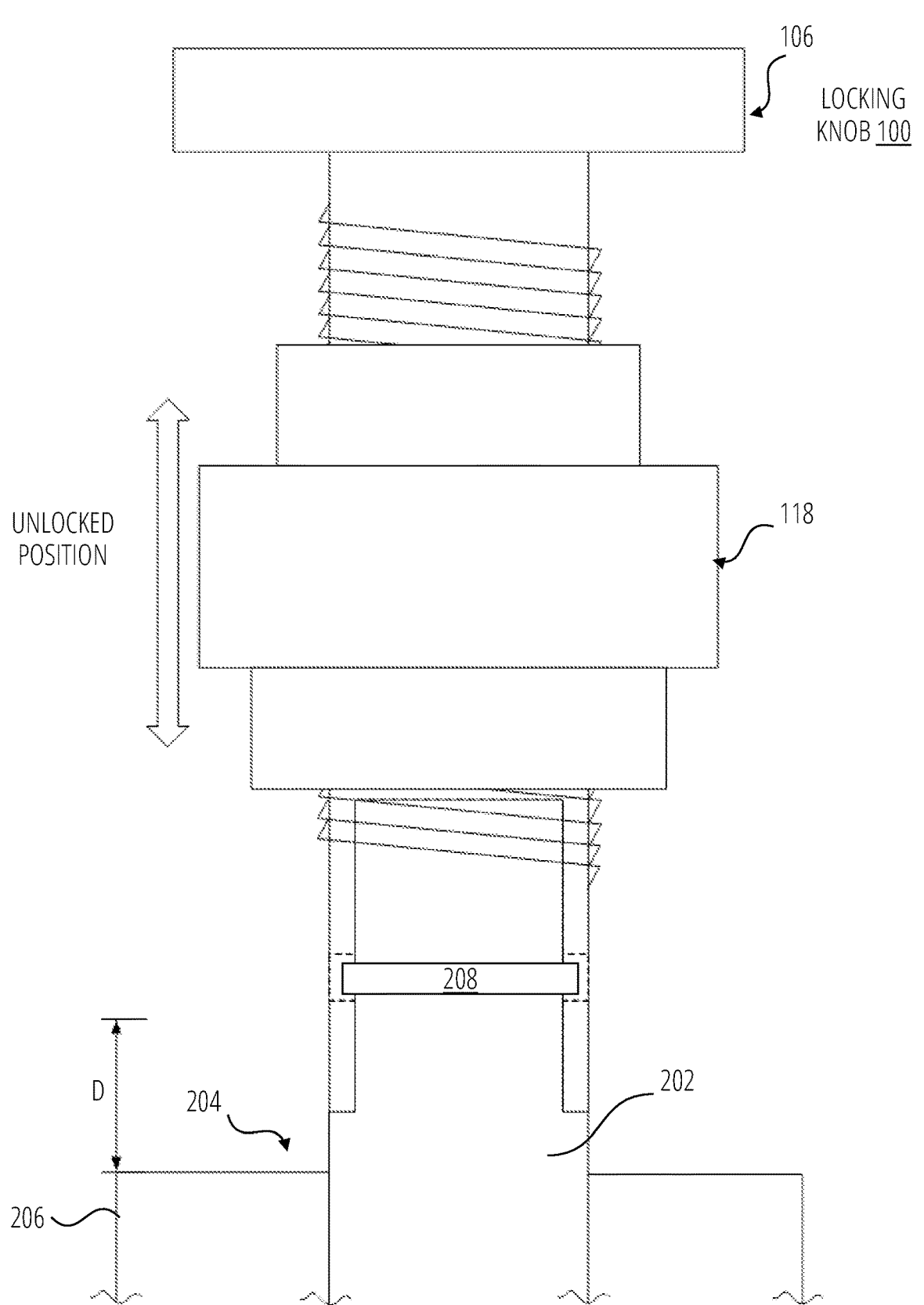
FIG. 2 shows a locking knob in an assembled state in an unlocked position, in accordance with an embodiment.

FIG. 2 shows a locking knob in an assembled state in an unlocked position, in accordance with an embodiment. The locking knob 100 is shown with push rod 106 threaded within the channel of the locking ring 118. The locking knob 100 is shown in an unlocked position, away from the air brake valve 204.

The locking knob 100 is installed on air brake valve 204 through mechanical coupling to the actuating arm 202 of the air brake valve 204. The actuating arm 202 of the air brake valve 204 is housed in the cavity of the push rod 106, and one or more fasteners 208 holds the actuating arm 202 fixed to the push rod 106.

Actuating arm 202 may be biased in a first position (e.g., with one or more springs not shown) in which the vehicle brake is engaged. This first position may be an extended position of the actuating arm 202 in what may be referred to as its 'normal' state in the absence of a force. In the unlocked position shown, the push rod 106 may be pushed into a body 206 of the air brake valve 204 to displace the actuating arm 202 at least the threshold distance D. In response to the actuating arm being displaced by at least the threshold distance D into the body 206, the air brake valve 204 changes state and the parking brake may become released.

Thus, a user may rotate the locking ring 118 which causes the locking ring to travel away from the valve body 206 and increases the permitted displacement of the actuating arm by at least the threshold amount. The locking ring 118 may remain held in place on the push rod 106 in the absence of a force, based on friction and inertia.

Figure 3:
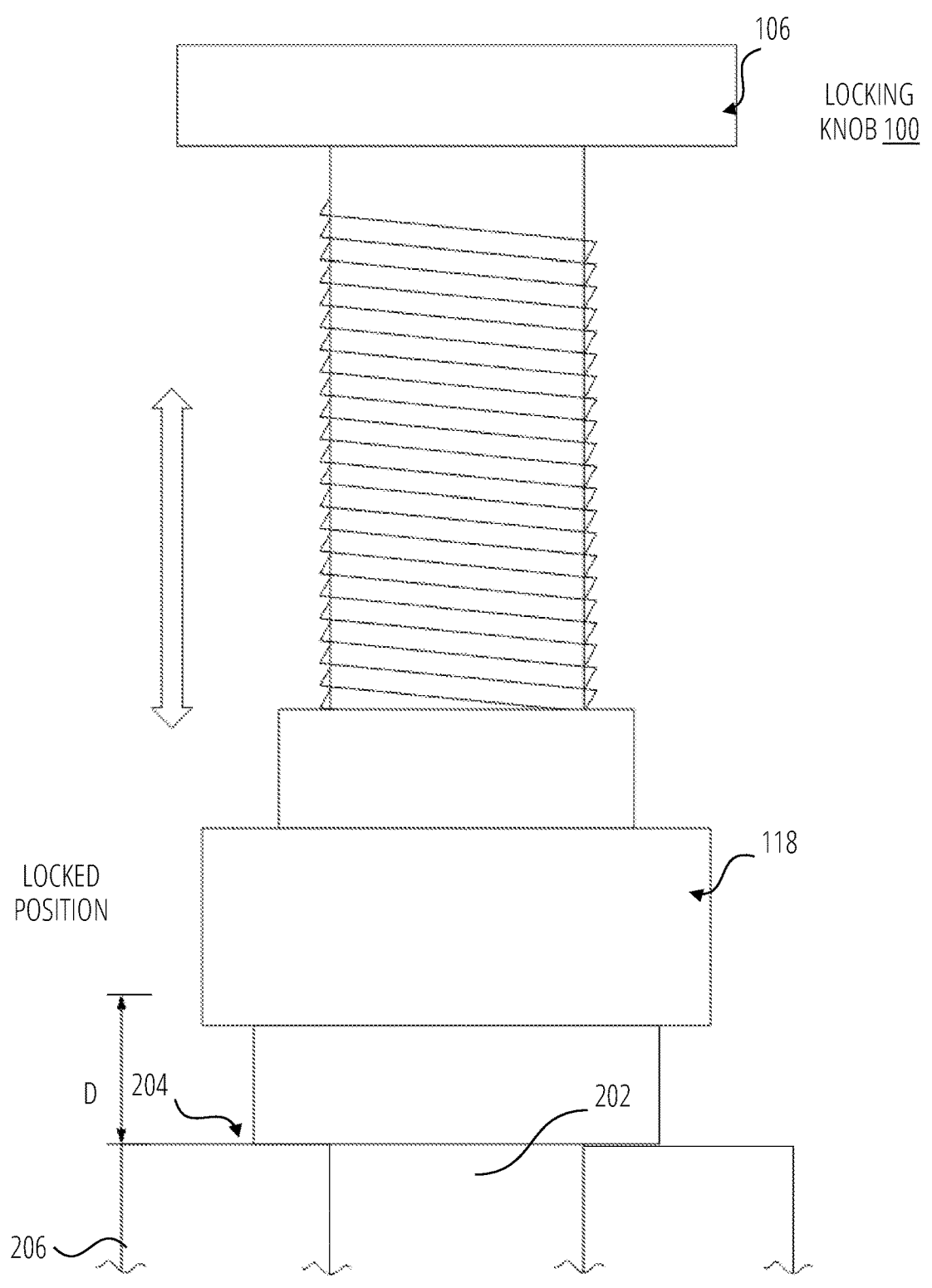
FIG. 3 shows the locking knob in an assembled state in a locked position, in accordance with an embodiment.

FIG. 3 shows the locking knob in an assembled state in a locked position, in accordance with an embodiment. The locking ring 118 is shown to have moved down the push rod (in response to a rotation force). When the locking ring 118 is within a threshold distance or greater to the body 206 of the air brake valve 204, displacement of the actuating arm 202 is restricted so that the air brake valve 204 cannot change state (e.g., from engaged to released).

When a user wishes to release the brake, the user may simply rotate the locking ring 118 which will spin freely on the push rod away from the air brake valve body 206. Once the distance between the locking ring and the body 206 satisfies the threshold amount D, the user may push the locking knob 100 and displace the actuation arm 202 to release the brake.

In embodiments, the valve 204 may be installed on a panel (e.g., a dashboard) of a vehicle, with the body 206 of the valve 204 being arranged below the panel and the locking knob 100 being exposed above the panel. The locking ring 118 may be rotated down until it makes contact with the panel. This has the same effect of limiting displacement of the actuating arm 202 as described above.

Figure 4:
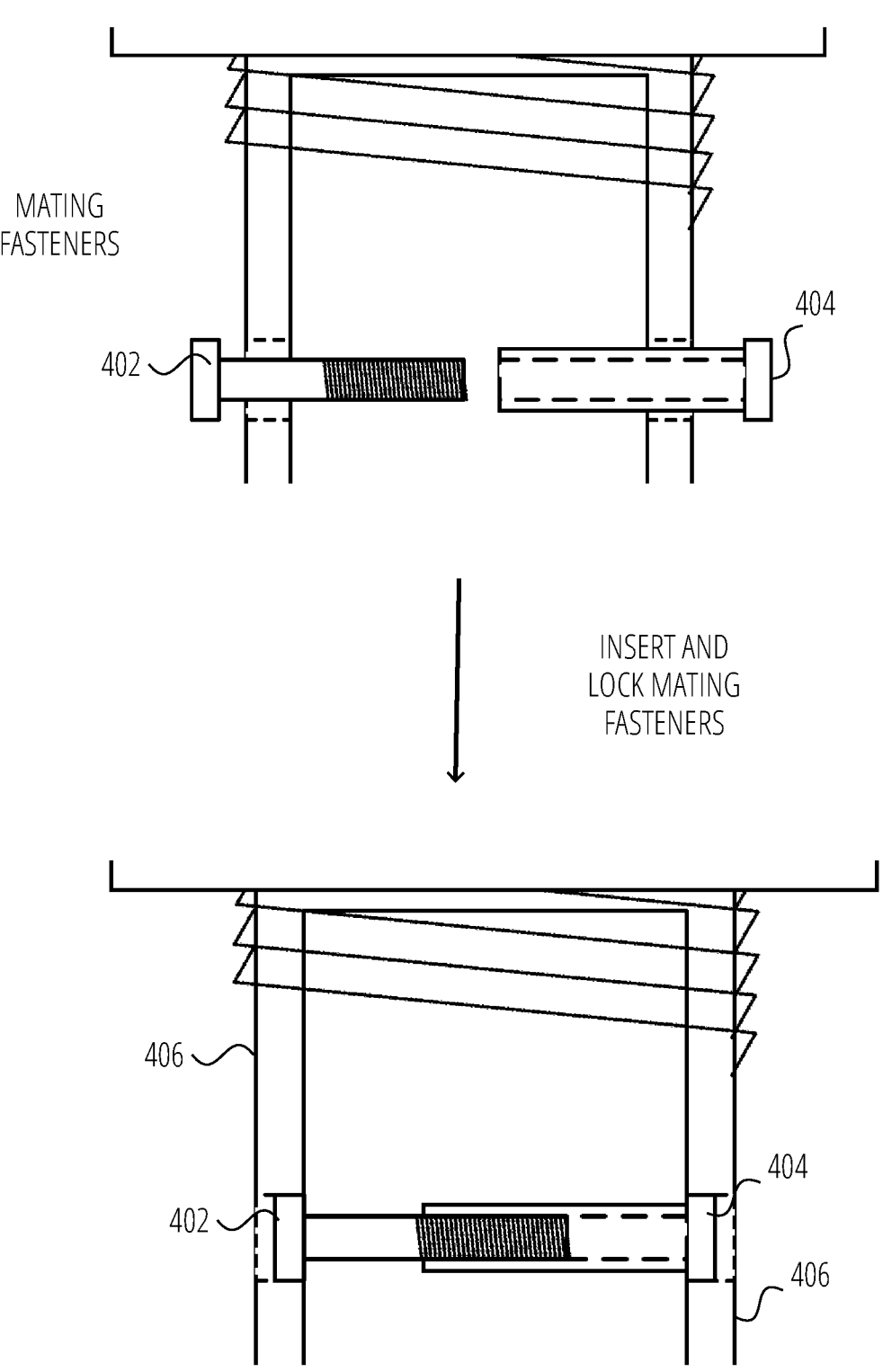
FIG. 4 shows an embodiment of a locking knob that is fixed to the air brake valve using mating fasteners, in accordance with an embodiment.

FIG. 4 shows an embodiment of a locking knob that is fixed to the air brake valve using mating fasteners, in accordance with an embodiment. The shaft portion of the push rod may include one or more openings that extend from the surface of the shaft to the cavity. Further, these one or more openings may be aligned with a feature (e.g., a channel, a ball, etc.) of the actuating arm of the air brake valve, to hold the actuating arm of the air brake valve fixed to the locking knob.

A first pin 402 is configured to enter a first of the one or more openings and a second pin 404 configured to enter a second of the one or more openings. The first pin and the second pin may comprise interlocking mating threads. For example, first pin 402 may have one or more threads on an outer surface of the pin 402. Second pin 404 may have second threads in a receptacle that is configured to receive and mate with the threads of the first pin 402. The two pins are held together when mated together through turning of respective pins.

For example, the pins may have slotted heads for a tool to turn the pins and connect them together. Further, the two pins may be arranged through a channel within the actuating arm of the air valve, thereby fixing the actuating arm to the push rod. The channel of the actuating arm is aligned with the one or more holes of the push rod. To decouple the locking button from the air valve, a user may back out each of the pins by rotating them in designated directions.

Figure 5:
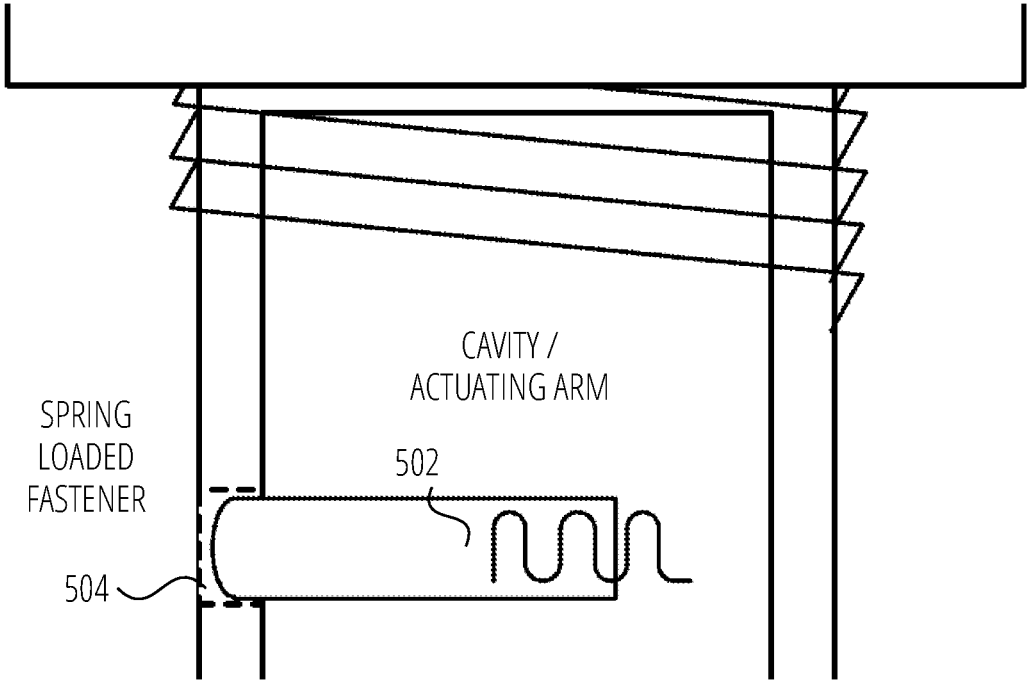
FIG. 5 shows a spring-loaded fastener that may engage with one or more holes of the push rod, in accordance with an embodiment.

When the pins 402, 404, are coupled together to hold the actuating arm in place, the heads of each pin may sit at least flush with the surface 406 of the shaft or deeper. This permits the locking ring to move over and past the pins and assume the locking position FIG. 5 shows a spring-loaded fastener that may engage with one or more holes of the push rod, in accordance with an embodiment.

The one or more holes 504 may be aligned with a spring-loaded fastener 502 of the actuating arm that is housed in the cavity of the push rod. Spring loaded fastener 502 may comprise a quick release ball lock, a pin, or other spring-loaded mechanism that engages with and becomes lodged in one or more holes 504 to hold the actuating arm fixed in the cavity of the push rod.

Figure 6:
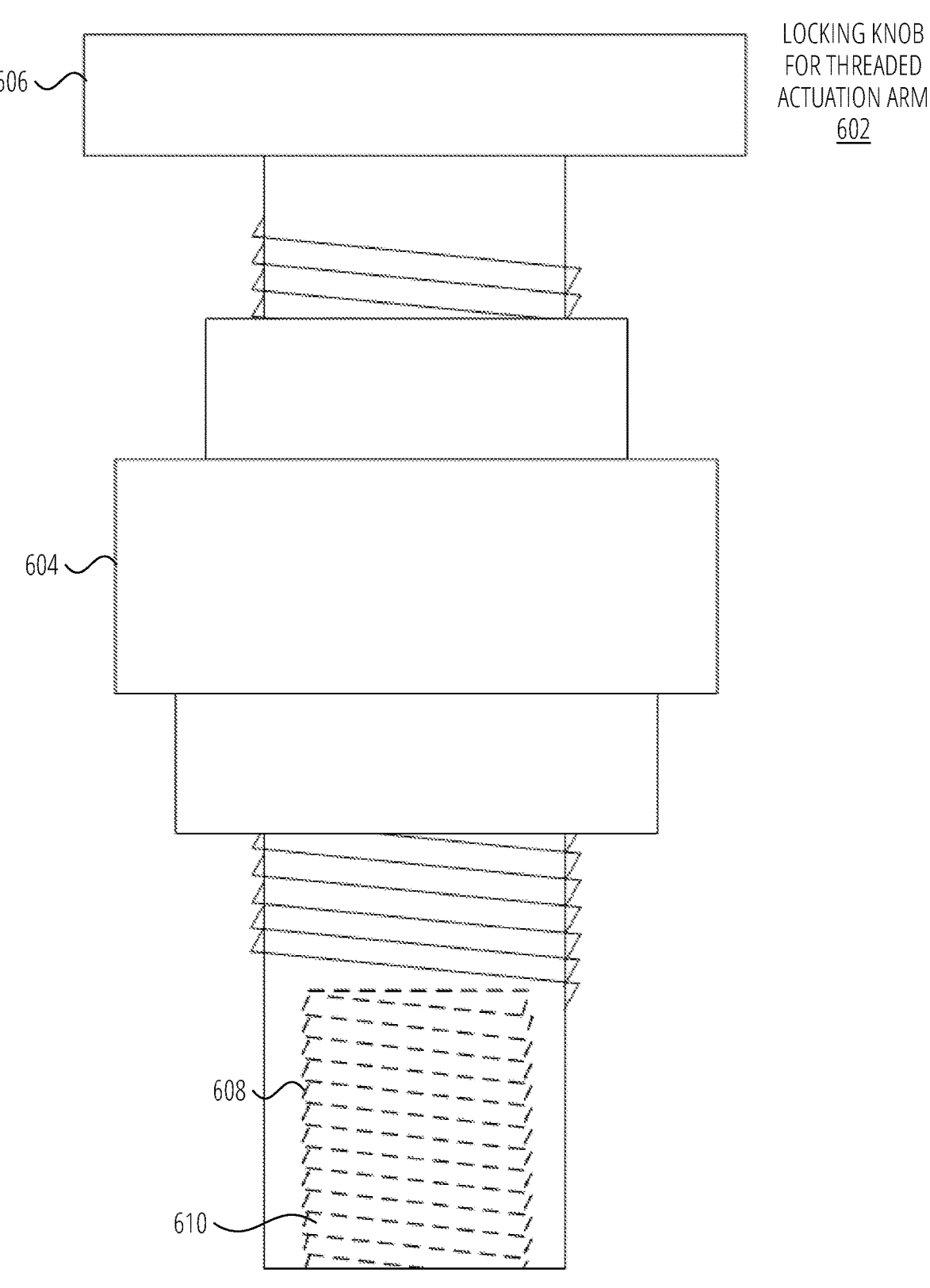
FIG. 6 shows a push rod having a threaded cavity, in accordance with an embodiment.

FIG. 6 shows a push rod having a threaded cavity, in accordance with an embodiment. A locking knob 602 may comprise a push rod 606 and locking knob 604. In this example, the cavity 608 may have threads 610 that are configured to mate with threads of the actuating arm to hold the actuating arm fixed to the push rod. The locking knob 604 may be rotated to lock or unlock the actuating arm, as described in other sections.

Figures 7A, 7B, 7C:
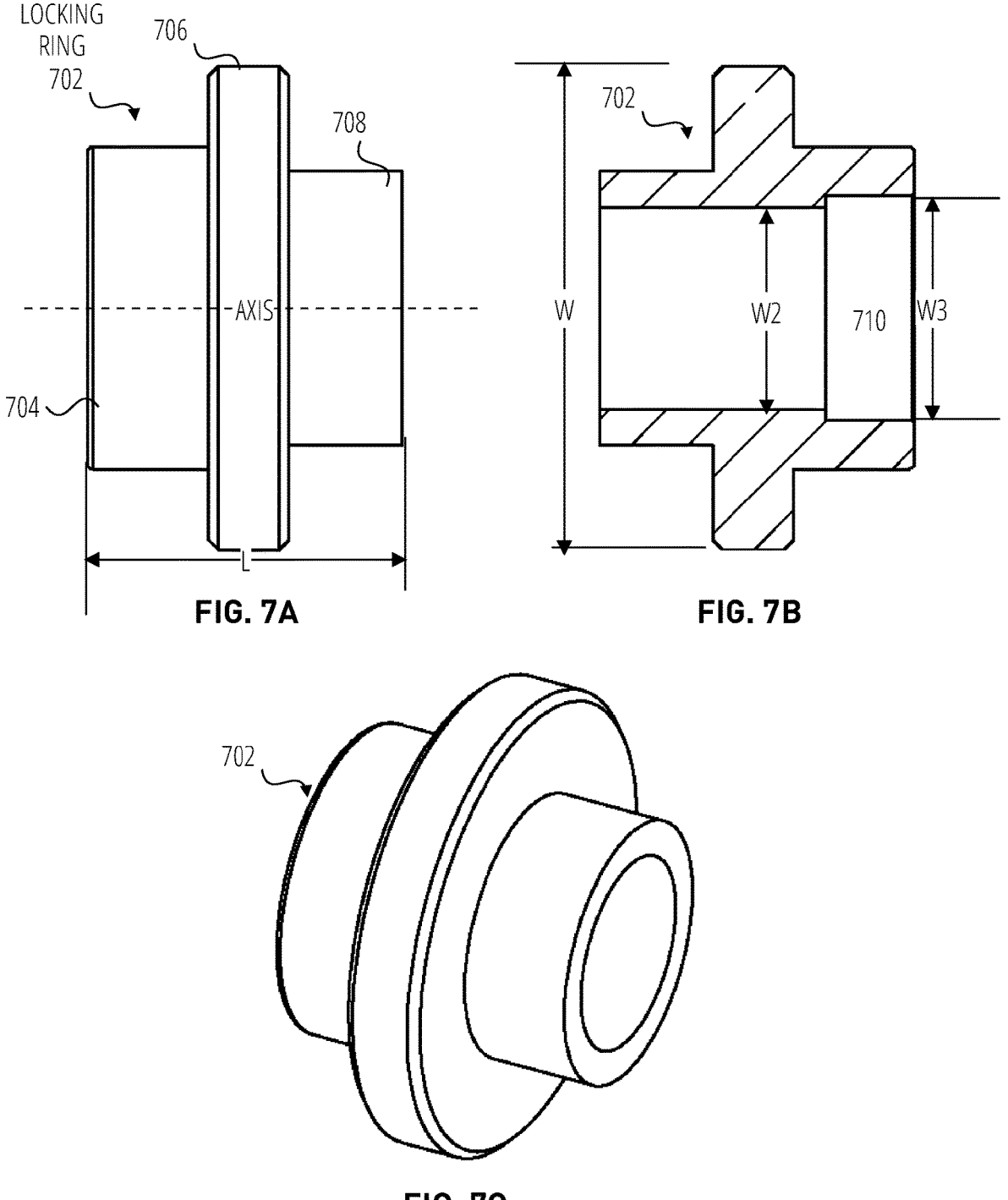
FIG. 7A shows a side view of the locking ring, in accordance with an embodiment.
FIG. 7B shows a mid-sectional view of the locking ring, in accordance with an embodiment.
FIG. 7C shows a perspective view of the locking ring, in accordance with an embodiment.

FIGS. 7A, 7B, and 7C show an example locking ring with several views, in accordance with an embodiment. Locking ring 702 may correspond to a locking ring described in other sections such as, for example, locking ring 118. FIG. 7A shows a side view of the locking ring. FIG. 7B shows a mid-sectional view of the locking ring, along its axis. FIG. 7C shows a perspective view of the locking ring.

In an example, the locking ring comprises a monolithic body that is separable from the push rod. The monolithic body may be a metal (e.g., aluminum or other suitable metal or metal alloy) that is machined from a single piece, to comprise a ring-like shape with threaded channel.

In an example, the locking ring comprises a length (L) along an axis of the channel that may range from 0.75" to 1.5". In another example, this length L may range from 1" to 1.25".

In an example, the locking ring comprises a width (W) that is perpendicular to the length that ranges from 0.75" to 2". In an example, the width W ranges from 1.25" to 1.5". In an example, a width (W2) of the channel ranges from 0.5" to 1.5", or from 0.75" to 1.25".

In an example, the locking ring comprises three sections which may include different widths. The sections may include a first collar 708, a second collar 704, and a middle portion 706 between the first collar and second collar. The middle portion 706 may extend out radially beyond the first collar and the second collar. When coupled to the pushing rod, the first collar 702 (which may have a smaller width) may be arranged to face the first end of the push rod, while the second collar may be arranged to face the second end of the push rod. In an embodiment, an opening of the channel within the facing the second end has a greater width (W3) than an opening of the channel facing the first end (W2). The extended width portion may be referred to as wide portion 710. The wide portion may be configured wider to accommodate contours or raised features of the air brake valve or of the panel on which the air brake valve is attached to.

Figure 8A:
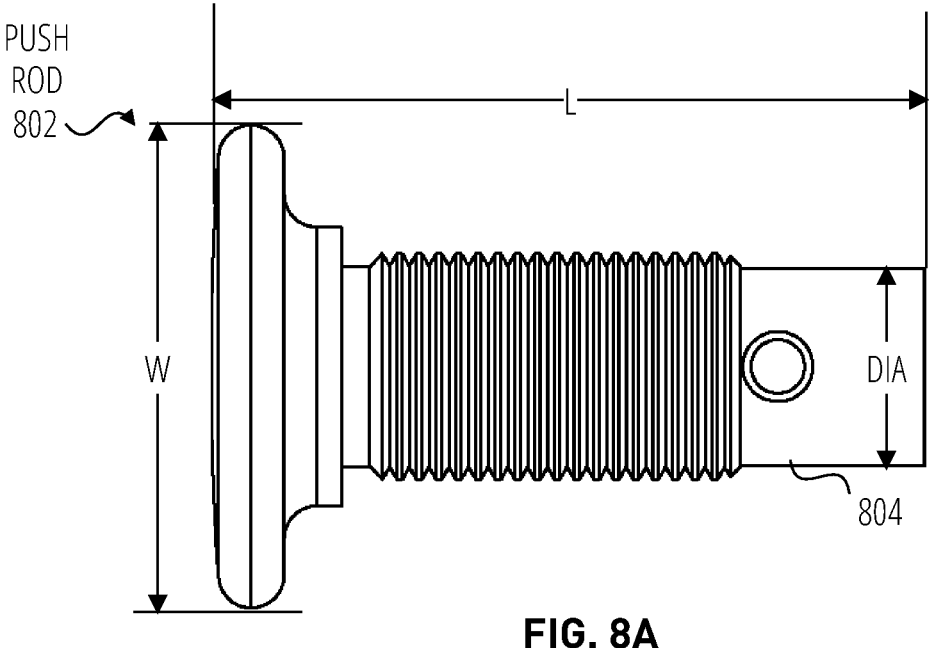
FIG. 8A shows a side view of the push rod, in accordance with an embodiment.
Figure 8B:
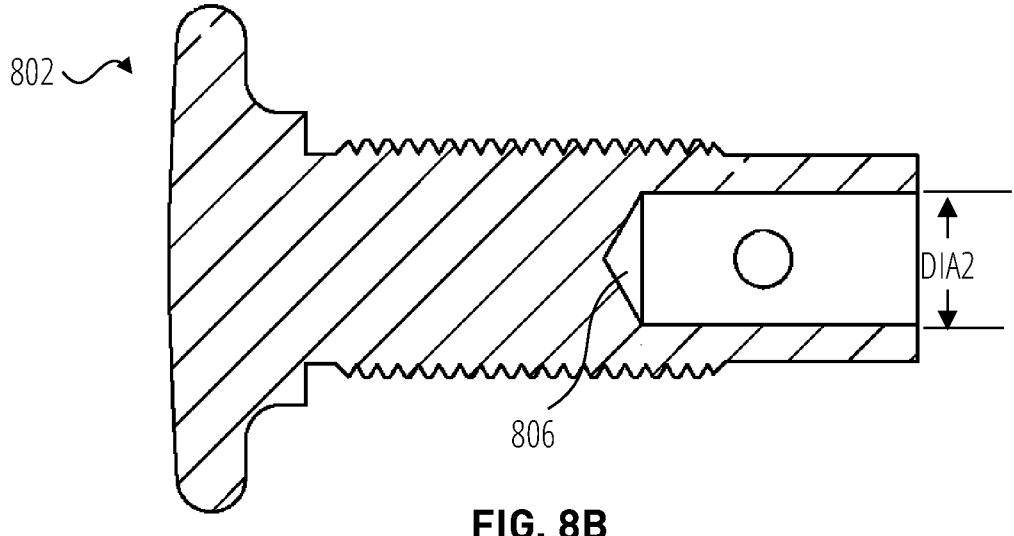
FIG. 8B shows a side-sectional view of the push rod, in accordance with an embodiment.

FIG. 8A and FIG. 8B show an example of a push rod with several views, in accordance with an embodiment. FIG. 8A shows a side view of the push rod 802. FIG. 8B shows a side-sectional view of the push rod 802.

In an example, the push rod comprises a monolithic body, for example, formed or machined from a single body of matter. In an example, the push rod comprises a metal or metal alloy (e.g., aluminum). In an example, push rod 802 comprises a length (L) along an axis of the push rod ranging from 1.75" to 2.5", or from 2" to 2.25".

In an example, the knob head of the push rod comprises a width (W) that is perpendicular to the length along the axis of the push rod, the width W ranging from 1.15" to 3", or from 1.65" to 2.5". In an example, the shaft portion 804 of the push rod comprises a diameter (an outer diameter DIA) ranging from 0.45" to 0.8", or from 0.55" to 0.7".

In an example, the cavity within the push rod comprises a diameter ranging from 0.25" to 0.6", or 0.35 to 0.5". In an example, the cavity includes a pointed tip portion 806 that may aid in proper alignment of the actuation arm of a valve.

Figure 9:
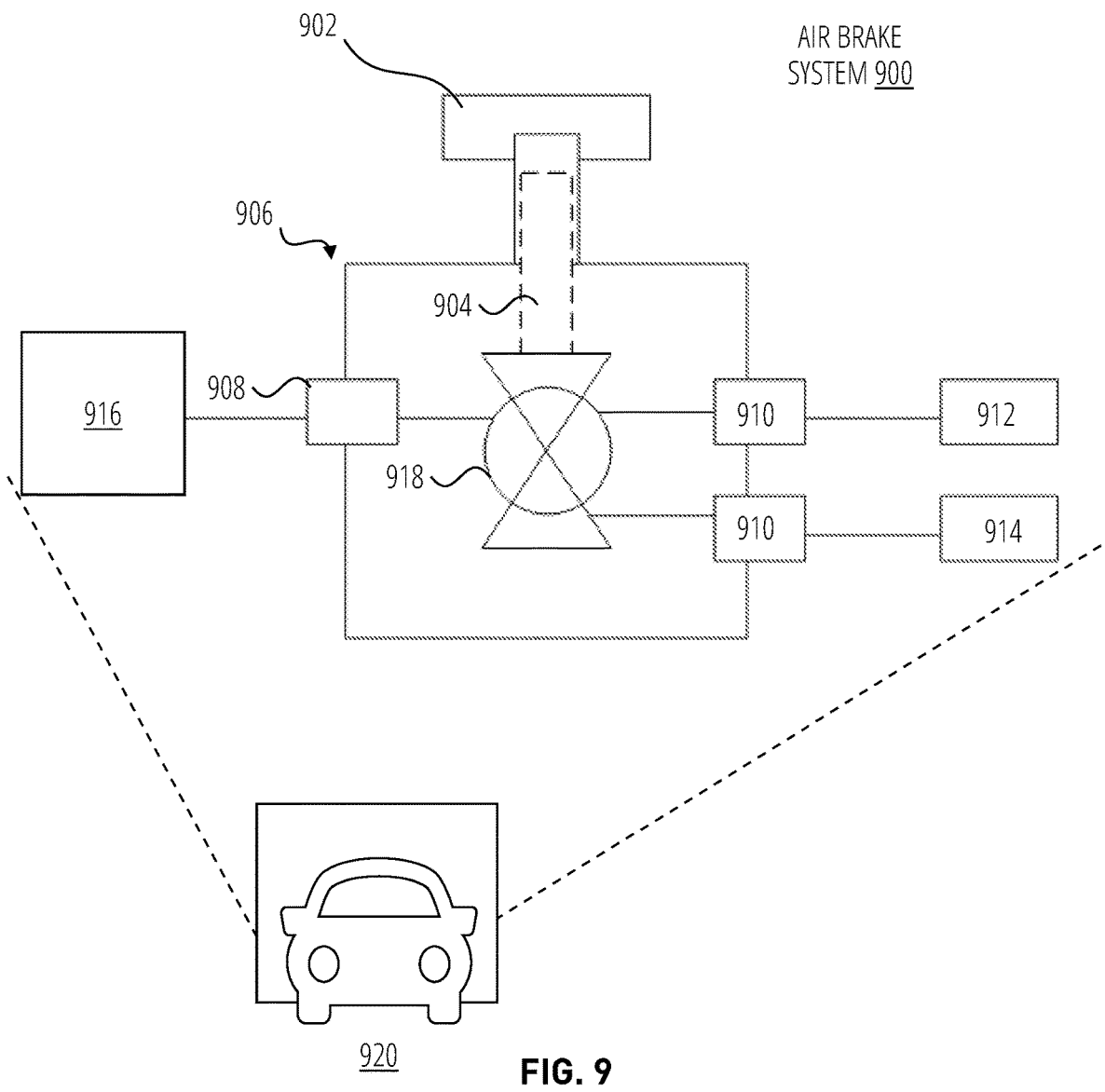
FIG. 9 shows an example of an air brake system of a vehicle, in accordance with an embodiment.

FIG. 9 shows an example of an air brake system 900 of a vehicle 920, in accordance with an embodiment. The air brake system 900 may include one or more air brakes (912, 914), a fluid pressure source 916, and air valve 906. Fluid lines (e.g., air brake hoses or conduit) may fluidly connect fluid pressure source 916, the one or more air brakes (912, 914), and the air valve 906. It should be understood that FIG. 9 shows a simplified air brake system to illustrate operation with respect to a locking knob (e.g., locking knob 100). Other details relating to air brake systems are known and are omitted for clarity.

Air brake system 900 may be a part of a complete air brake system (not shown) which may include a parking brake, a service brake, and an emergency brake. Air brake system 900 may be simplified part of the parking brake portion of a complete air brake system of a vehicle.

In an example, the fluid pressure source 916 may comprise an air compressor or compressed air tank that provides air pressure to the fluid lines. The air brakes 912, 914, may each comprise a pressure-controlled brake that engages or disengages a brake on vehicle 920 based on the input pressure. Air brakes 912 and 914 may be referred to as pneumatic air brakes.

Air valve 906 may be fluidly connected between the fluid pressure source 916 and the one or more air brakes 912, 914. The air valve 906 may be referred to as an air valve assembly or air brake valve assembly. The air valve 906 may include one or more first fluid ports (908) fluidly connected to the fluid pressure source 916, and one or more second fluid ports (910) fluidly connected to the one or more air brakes (912, 914).

The air valve 906 is configured to transfer or block the air pressure from the input port to the output port. For example, within the air valve 906, a valve 918 is configured to fluidly connect or fluidly disconnect the one or more first ports 908 with the one or more second ports 910. The state (connected or disconnected) of the valve 918 depends on the actuating arm 904 of the air valve 906. The actuating arm 904 is coupled to the valve (e.g., mechanically) such that in response to displacement of the actuating arm 904 satisfying a threshold distance, the valve is moved to a first position to disengage the one or more air brakes (912, 914). In response to displacement of the actuating arm 904 not satisfying the threshold distance, the valve assumes a second position to engage the one or more air brakes (912, 914).

A locking knob 902 is attached to actuating arm. Although simplified in this drawing, the locking knob 902 may correspond to any of locking knob embodiments described in the other sections. Locking knob 902 comprises a push button and locking ring that work together to provide a locked state of the air brakes 912 and 914 in the engaged state, when the locking ring is rotated as described. The locking ring may be rotated to unlock the locking knob 902, which allows a user to release the air brakes 912, 914.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

What is claimed is:

1. A locking knob for a valve, comprising:
a push rod comprising
    a knob head at a first end of the push rod,
    first thread along an exterior surface of the push rod, and
    a cavity within the push rod exposed at a second end of the push rod opposite of the first end, the cavity configured to house an actuating arm of the valve that is held fixed to the push rod; and
a locking ring comprising
    a ring-shaped body with a channel that is configured to house the push rod, and
    second thread within the channel that is configured to mate with the first thread,
    wherein rotation of the locking ring in a first direction moves the locking ring toward the second end of the push rod which restricts travel of the push rod and the actuating arm of the air valve by a threshold amount to prevent actuation of the air valve.

2. The locking knob of claim 1, wherein second rotation of the locking ring in a second direction moves the locking ring on the push rod toward the first end and permits the travel of the rod to at least the threshold amount to allow actuation of the air valve.

3. The locking knob of claim 1, wherein the push rod comprises one or more openings extending from the cavity of the push rod to the exterior surface of the push rod.

4. The locking knob of claim 3, further comprising: a first pin configured to enter a first of the one openings and a second pin configured to enter a second of the one or more openings, wherein the first pin and the second pin each comprise interlocking mating threads and become arranged through a channel within the actuating arm of the air valve to fix the actuating arm to the push rod.

5. The locking knob of claim 3, wherein the one or more openings are configured to house respective heads of the first pin and the second pin to sit at least flush with an exterior surface of the push rod, permitting travel of the locking ring past the respective heads of the first pin and second pin when arranged in the one or more openings.

6. The locking knob of claim 1, wherein the one or more openings are to house one or more spring-loaded pins that extend out from the arm of the air valve, to fix the actuating arm to the push rod.

7. The locking knob of claim 1, wherein the cavity comprises third thread configured to mate with fourth thread of the actuating arm of the valve.

8. The locking knob of claim 1, wherein the push rod comprises a monolithic body that is separable from the locking ring.

9. The locking knob of claim 1, wherein the locking ring comprises a monolithic body that is separable from the push rod.

10. The locking knob of claim 1, wherein the push rod comprises a length along an axis of the push rod ranging from 1.75" to 2.5".

11. The locking knob of claim 10, wherein the knob head of the push rod comprises a width that is perpendicular to the length along the axis of the push rod, the width ranging from 1.15" to 3".

12. The locking knob of claim 10, wherein a shaft portion of the push rod comprises a diameter ranging from 0.45" to 0.8".

13. The locking knob of claim 12, wherein the cavity within the push rod comprises a diameter ranging from 0.25" to 0.6".

14. The locking knob of claim 1, wherein the locking ring comprises a length along an axis of the channel ranging from 0.75" to 1.5".

15. The locking knob of claim 14, wherein the locking ring comprises a width that is perpendicular to the length ranging from 0.75" to 2".

16. The locking knob of claim 14, wherein the channel of the locking ring comprises a width of the channel ranging from 0.5" to 1.5".

17. The locking knob of claim 1, wherein the locking ring comprises a first collar facing the first end, a second collar arranged at the second end, and a middle portion between the first collar and the second collar, the middle portion extending out radially beyond the first collar and the second collar.

18. The locking knob of claim 17, wherein an opening of the channel facing toward the second end of the push rod is wider than a second opening of the channel facing toward the first end of the push rod.

19. An air valve assembly comprising:

one or more first fluid ports and one or more second fluid ports;

a valve, configured to fluidly connect or fluidly disconnect the one or more first ports with the one or more second ports;

an actuating arm that is coupled to the valve, wherein in response to displacement of the actuating arm satisfying a threshold distance, the valve is moved to a first position, and in response to displacement of the actuating arm not satisfying the threshold distance, the valve is moved to a second position; and a locking knob, comprising:

a push rod comprising a knob head at a first end of the push rod, first thread along an exterior surface of the push rod, and a cavity within the push rod exposed at a second end of the push rod opposite of the first end, the cavity configured to house the actuating arm of the air valve assembly that is held fixed to the push rod; and a locking ring comprising a ring-shaped body with a channel that is configured to house the push rod, and second thread within the channel that is configured to mate with the first thread, wherein rotation of the locking ring in a first direction moves the locking ring toward the second end of the push rod which restricts travel of the push rod and the actuating arm of the air valve assembly by a threshold amount to prevent the valve from moving from the second position to the first position.

20. A vehicle, comprising:

a pneumatic air brake;

a fluid pressure source;

and air valve assembly, fluidly connected between the fluid pressure source and the pneumatic air brake through one or more fluid lines, the air valve assembly comprising:

one or more first fluid ports fluidly connected to the fluid pressure source and one or more second fluid ports fluidly connected to the pneumatic air brake;

a valve, configured to fluidly connect or fluidly disconnect the one or more first ports with the one or more second ports;

an actuating arm that is coupled to the valve, wherein in response to displacement of the actuating arm satisfying a threshold distance, the valve is moved to a first position to disengage the pneumatic air brake, and in response to displacement of the actuating arm not satisfying the threshold distance, the valve is moved to a second position to engage the pneumatic air brake; and a locking knob, comprising:

a push rod comprising a knob head at a first end of the push rod, first thread along an exterior surface of the push rod, and a cavity within the push rod exposed at a second end of the push rod opposite of the first end, the cavity configured to house the actuating arm of the air valve assembly that is held fixed to the push rod; and a locking ring comprising a ring-shaped body with a channel that is configured to house the push rod, and second thread within the channel that is configured to mate with the first thread, wherein rotation of the locking ring in a first direction moves the locking ring toward the second end of the push rod which restricts travel of the push rod and the actuating arm of the air valve assembly by a threshold amount to prevent the valve from moving from the second position to the first position.

* * * * *